US012605977B2

(12) United States Patent
Nam

(10) Patent No.: US 12,605,977 B2
(45) Date of Patent: Apr. 21, 2026

(54) DEVICE, SERVER, AND METHOD FOR CONTROLLING VEHICLE

(71) Applicants: Hyundai Motor Company, Seoul (KR); Kia Corporation, Seoul (KR)

(72) Inventor: Joo Han Nam, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 177 days.

(21) Appl. No.: 18/509,740

(22) Filed: Nov. 15, 2023

(65) Prior Publication Data

US 2024/0351385 A1 Oct. 24, 2024

(30) Foreign Application Priority Data

Apr. 19, 2023 (KR) ........................ 10-2023-0051333

(51) Int. Cl.
B60D 1/36 (2006.01)
B60D 1/46 (2006.01)
(Continued)

(52) U.S. Cl.
CPC ............... B60D 1/36 (2013.01); B60D 1/465 (2013.01); G05D 1/101 (2013.01); G06V 20/17 (2022.01);
(Continued)

(58) Field of Classification Search
CPC ........... B60D 1/36; B60D 1/465; H04W 4/80; H04W 4/40; H04W 4/44; H04W 4/46; H04W 4/48; H04W 4/50; H04W 12/00; H04W 12/009; H04W 12/69; H04W 4/022; H04W 4/00; H04W 4/02; H04W 4/021; G06V 20/17; G06V 2201/07; G06V 2201/08; G05D 1/101; G05D 1/0027; G05D 1/692; G07C 5/004; G07C 5/00; G07C 5/02; G07C 5/008; G07C 5/0841; G01C 21/3697; G01C 21/3415; G01C 21/3469; G01C 21/3484; G01C 21/26; G01C 21/34;
(Continued)

(56) References Cited

U.S. PATENT DOCUMENTS

2019/0066503 A1* 2/2019 Li ........................ G05D 1/0094
2019/0113632 A1* 4/2019 Lucrecio ............... G01S 5/0036
(Continued)

FOREIGN PATENT DOCUMENTS

KR          101715300 B1    3/2017
KR     10-2022-0051675 A    4/2022

*Primary Examiner* — James J Yang
*Assistant Examiner* — Anthony D Afrifa-Kyei
(74) *Attorney, Agent, or Firm* — Banner & Witcoff, Ltd.

(57) ABSTRACT

The present disclosure relates to a device, an air mobility, a server, and a method for controlling a vehicle. The device includes a communication device, a memory storing vehicle information and air mobility device information, and a processor. The processor is configured to select, based on the vehicle information, a target vehicle to be coupled to a trailer, select, based on the air mobility device information, a target air mobility device, and transmit, via the communication device, at least one signal. The at least one signal includes an indication for requesting the target vehicle to move to a location of the trailer, and an indication for requesting the target air mobility device to capture at least one image containing the target vehicle and the trailer.

20 Claims, 10 Drawing Sheets

(51) Int. Cl.

| | | |
|---|---|---|
| *G05D 1/00* | (2006.01) | |
| *G06V 20/17* | (2022.01) | |
| *H04W 4/40* | (2018.01) | |
| *H04W 4/80* | (2018.01) | |

(52) U.S. Cl.
CPC .............. *H04W 4/40* (2018.02); *H04W 4/80* (2018.02); *G06V 2201/07* (2022.01); *G06V 2201/08* (2022.01)

(58) Field of Classification Search
CPC .... G01C 21/3453; B60K 35/22; B60K 35/28; B60K 2360/169; B60K 2360/172; B60K 2360/175; B60K 2360/178; B60K 2360/1876; B60K 35/21; B60K 2360/56; B60K 2360/573; B60K 2360/592; B60W 40/10; B60W 40/13; B60W 60/0011; B60W 60/0023; B60W 2530/203; B60W 2540/049; B60W 50/0098; B60W 50/14; B60W 2050/0075; B60W 2556/45; B60W 40/08; B60W 50/00; B60W 50/08; B60W 50/10; B62D 35/00; B62D 37/02; B60L 2200/28; B60L 2260/52; B60L 2270/32; B60L 2270/34; B60L 2270/36; H04L 67/12; H04L 9/32; H04L 9/321; H04L 9/3215; H04L 9/3218; H04L 9/3226; H04L 9/3234; H04L 9/3236; H04L 9/3247; H04L 9/3263; H04L 9/3271; H04L 9/3297; G08G 1/164; B60R 11/04; G06Q 50/40
See application file for complete search history.

(56) References Cited

U.S. PATENT DOCUMENTS

| | | | | |
|---|---|---|---|---|
| 2019/0339704 A1* | 11/2019 | Yu | .............................. | G06T 7/66 |
| 2020/0254931 A1* | 8/2020 | Herman | ................. | G06V 20/56 |
| 2021/0053407 A1* | 2/2021 | Smith | ................... | B25J 19/021 |
| 2022/0063582 A1* | 3/2022 | Peng | ................... | B62D 15/025 |
| 2022/0118942 A1 | 4/2022 | Nam et al. | | |
| 2023/0038422 A1* | 2/2023 | Redden | ................. | B60W 40/02 |
| 2023/0264686 A1* | 8/2023 | Van Wiemeersch .. | | B60W 30/06 |
| | | | | 701/2 |

* cited by examiner

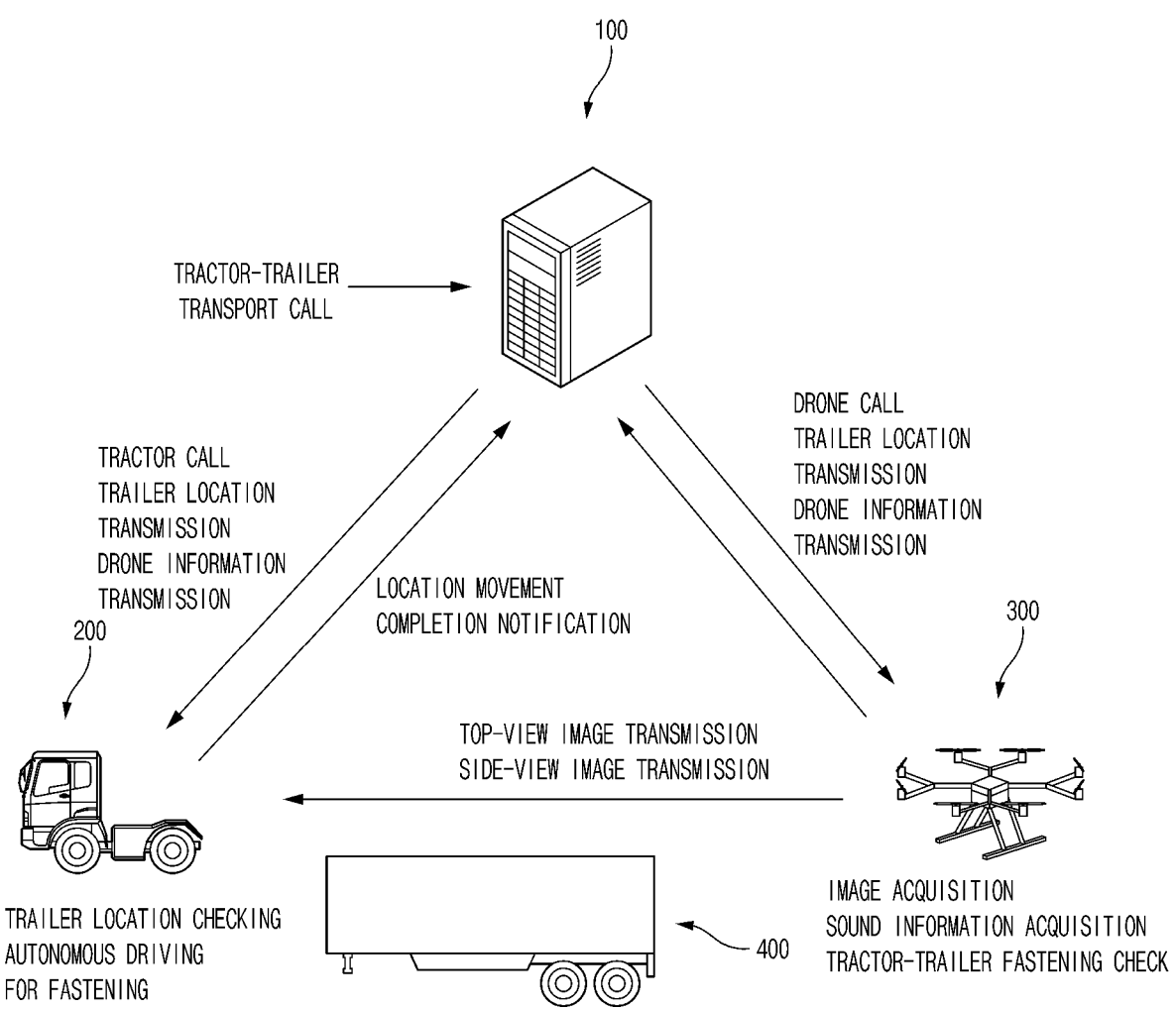

100

TRACTOR-TRAILER
TRANSPORT CALL

DRONE CALL
TRAILER LOCATION
TRANSMISSION
DRONE INFORMATION
TRANSMISSION

TRACTOR CALL
TRAILER LOCATION
TRANSMISSION
DRONE INFORMATION
TRANSMISSION

200

LOCATION MOVEMENT
COMPLETION NOTIFICATION

300

TOP-VIEW IMAGE TRANSMISSION
SIDE-VIEW IMAGE TRANSMISSION

TRAILER LOCATION CHECKING
AUTONOMOUS DRIVING
FOR FASTENING

IMAGE ACQUISITION
SOUND INFORMATION ACQUISITION
TRACTOR-TRAILER FASTENING CHECK

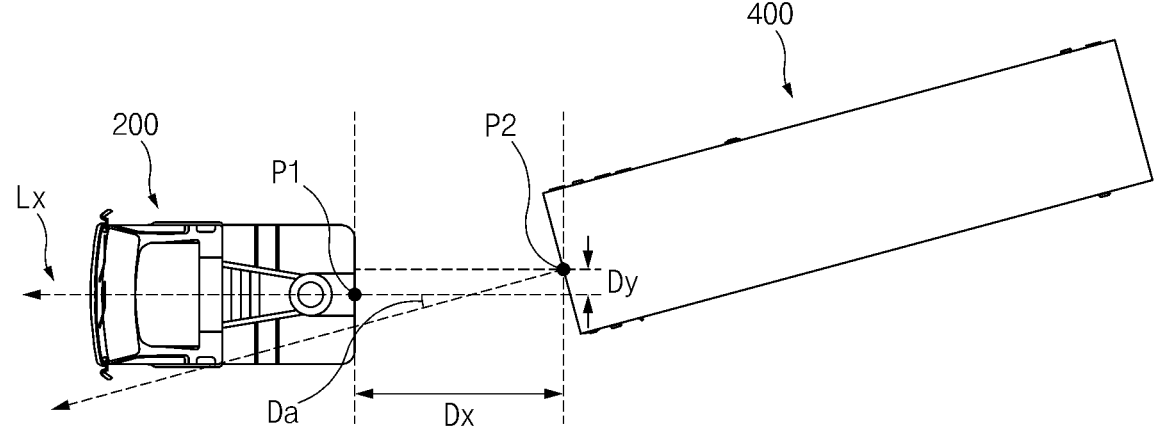
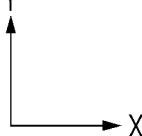
FIG.4

P1        P2
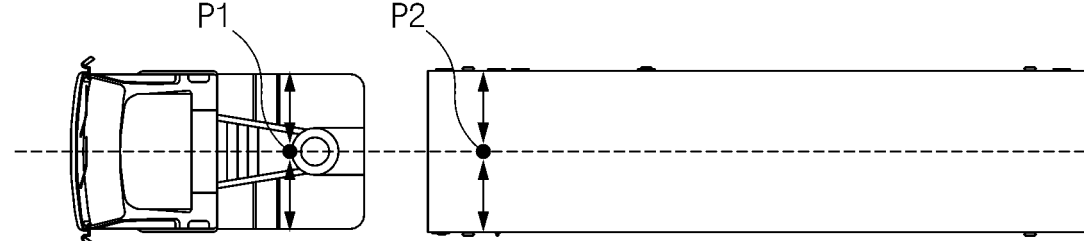
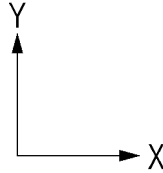
Y
X
FIG.5

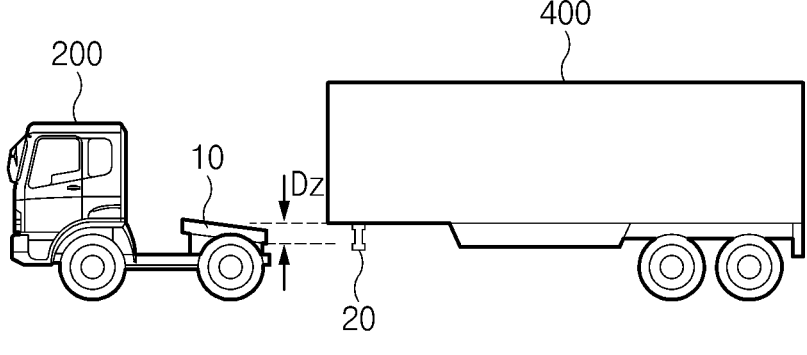
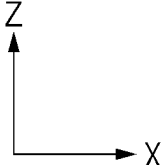
FIG.6

DEVICE, SERVER, AND METHOD FOR CONTROLLING VEHICLE

CROSS-REFERENCE TO RELATED APPLICATION

This application claims the benefit of priority to Korean Patent Application No. 10-2023-0051333, filed in the Korean Intellectual Property Office on Apr. 19, 2023, the entire contents of which are incorporated herein by reference.

TECHNICAL FIELD

The present disclosure relates to a device, a server, and a method for controlling a vehicle.

BACKGROUND

A tractor (also referred to as a tractor unit, a semi-trailer truck, a semi-truck, etc.) refers to a vehicle that may be coupled to a trailer and may transport the trailer.

To couple the trailer and the tractor to each other, a driver must move the tractor backward such that a coupler located at a rear portion of the tractor and a kingpin of the trailer are coupled to each other.

A process of directly driving the tractor and coupling the tractor to the trailer is a process that is cumbersome and increases fatigue of the driver. Therefore, a considerable amount of labor is required for the driver to connect the tractor and the trailer to each other in person, especially when there are multiple tractors and trailers, such as in a distribution center.

In addition, because a large distribution center may be constructed on a considerable scale, even the process of locating a tractor and a trailer to be operated among numerous tractors and trailers by an operator may take a considerable amount of time.

SUMMARY

The present disclosure has been made to solve the above-mentioned problems occurring in the prior art while advantages achieved by the prior art are maintained intact.

An aspect of the present disclosure provides a device, a server, and a method for controlling a vehicle that may more easily couple a tractor and a trailer to each other.

Another aspect of the present disclosure provides a device, a server, and a method for controlling a vehicle for reducing consumption of an excessive labor force in a process of coupling a tractor and a trailer to each other.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a computing device for controlling vehicles may include: a communication device; a memory storing vehicle information and air mobility device information; and a processor. The processor may be configured to: select, based on the vehicle information, a target vehicle to be coupled to a trailer; select, based on the air mobility device information, a target air mobility device; and transmit, via the communication device, at least one signal. The at least signal may include: an indication for requesting the target vehicle to move to a location of the trailer; and an indication for requesting the target air mobility device to capture at least one image containing the target vehicle and the trailer.

The at least one signal may further include an indication for requesting the target air mobility device to attempt to establish, based on identification information of the target vehicle and the trailer, a short-range communication with the target vehicle.

The at least one signal may further include an indication for requesting the target air mobility device to capture, based on a distance between the target vehicle and the trailer being less than a threshold distance, a top-view image of the target vehicle.

The at least one signal may further include an indication for requesting, based on completion of horizontal alignment between the target vehicle and the trailer for coupling, the target air mobility device to capture a side-view image of the target vehicle.

The at least one signal may further include an indication for requesting the target air mobility device to continuously capture side-view images of the target vehicle while the target vehicle is moving backward to be coupled to the trailer.

The at least one signal may further include an indication for requesting the target air mobility device to acquire external sound information while the target vehicle is moving backward to be coupled to the trailer.

The processor may be configured to transmit, based on confirmation of coupling of the target vehicle with the trailer, a transport instruction to the target vehicle.

According to one or more example embodiments, a device configured to control a vehicle may include: a communication device configured to receive at least one image containing the vehicle and a trailer; a movement controller configured to control movement of the vehicle; a vehicle height controller configured to adjust a height of the vehicle; and a processor. The processor may be configured to: cause, based on the image, the movement controller to horizontally align the vehicle with the trailer for coupling the vehicle to the trailer; and cause the vehicle height controller to adjust the height of the vehicle to vertically align the vehicle with the trailer for coupling the vehicle to the trailer.

The communication device may be configured to receive, via a short-range communication channel, the image from an air mobility device.

The image may include a top-view image of the vehicle. The processor may be further configured to cause the movement controller to adjust, based on the top-view image, a heading angle deviation between the vehicle and the trailer to be less than or equal to a threshold angle.

The processor may be further configured to cause the movement controller to adjust a lateral distance between a first axis, which passes through a first reference point of the vehicle, and a second reference point of the trailer to be less than or equal to a first threshold value, and adjust a longitudinal distance between the first reference point and the second reference point to be less than or equal to a second threshold value. The first reference point may include a midpoint of a rear edge of the vehicle. The first axis may include a longitudinal line that passes through the first reference point and through a midpoint of a front edge of the vehicle. The second reference point may include a midpoint of a front edge of the trailer.

The image may include a side-view image of the vehicle. The processor may be further configured to: detect, based on the side-view image, a coupler and a kingpin; and cause the vehicle height controller to adjust a height difference between the coupler and the kingpin to be less than or equal to a first threshold value.

The processor may be further configured to: monitor the side-view image received via the communication device while the vehicle is moving backward; and determine, based on the side-view image and based on a determination that a distance between the coupler and the kingpin is less than or equal to a second threshold value, that the vehicle and the trailer are coupled to each other.

The processor may be further configured to: receive, via the communication device and while the vehicle is moving backward, sound information from a microphone located within a predetermined distance from one of the vehicle or the trailer; and determine, based on the sound information, completion of the coupling of the vehicle and the trailer.

According to one or more example embodiments, a method for controlling a vehicle may include: causing, based on a first image containing the vehicle and a trailer, the vehicle to move to a horizontally aligned position for coupling with the trailer; detecting, based on a second image, a first fastener of the vehicle and a second fastener of the trailer; adjusting a height of the vehicle to align a vertical level of the first fastener with a vertical level of the second fastener; and causing, based on a determination that the vehicle is horizontally and vertically aligned to the trailer, the vehicle to move backward to couple the first fastener of the vehicle to the second fastener of the trailer.

The first image may be a top-view image. The method may further include: acquiring, using an air mobility device, the top-view image from above the vehicle and the trailer; determining a heading angle deviation between the vehicle and the trailer; and detecting a first midpoint of a rear edge of the vehicle and detecting a second midpoint of a front edge of the trailer.

Causing the vehicle to move to the horizontally aligned position may include: causing the vehicle to adjust a heading angle deviation between the vehicle and the trailer to be less than or equal to a threshold angle.

Causing the vehicle to move to the horizontally aligned position may include: causing the vehicle to adjust a lateral distance between a first axis, which passes through a first reference point of the vehicle, and a second reference point of the trailer to be less than or equal to a first threshold value; and causing the vehicle to adjust a longitudinal distance between the first reference point and the second reference point to be less than or equal to a second threshold value. The first reference point may include a midpoint of a rear edge of the vehicle. The first axis may include a longitudinal line that passes through the first reference point and through a midpoint of a front edge of the vehicle. The second reference point may include a midpoint of a front edge of the trailer.

The second image may include a side-view image of the vehicle. The first fastener may include a coupler. The second fastener may include a kingpin. Adjusting the height of the vehicle may include: adjusting the height of the vehicle to align a vertical level difference between the coupler and the kingpin to be less than or equal to a threshold value.

The second image may include a side-view image of the vehicle. The first fastener may include a coupler. The second fastener may include a kingpin. The method may further include coupling the first fastener of the vehicle to the second fastener of the trailer by: monitoring the side-view image while the vehicle is moving backward; and determining, based on the monitoring of the side-view image, whether a distance between the coupler and the kingpin is less than or equal to a threshold value.

BRIEF DESCRIPTION OF THE DRAWINGS

The above and other objects, features and advantages of the present disclosure will be more apparent from the following detailed description taken in conjunction with the accompanying drawings:

FIG. 1 is a schematic diagram of a system for controlling a vehicle;

FIG. 4 is a diagram showing an example of a top-view image acquired by a drone;

FIG. 5 is a view showing a location of a tractor and a trailer whose horizontal alignment has been completed;

FIG. 6 is a diagram for illustrating a method for adjusting a vertical level of a tractor.

DETAILED DESCRIPTION

Figure 2:
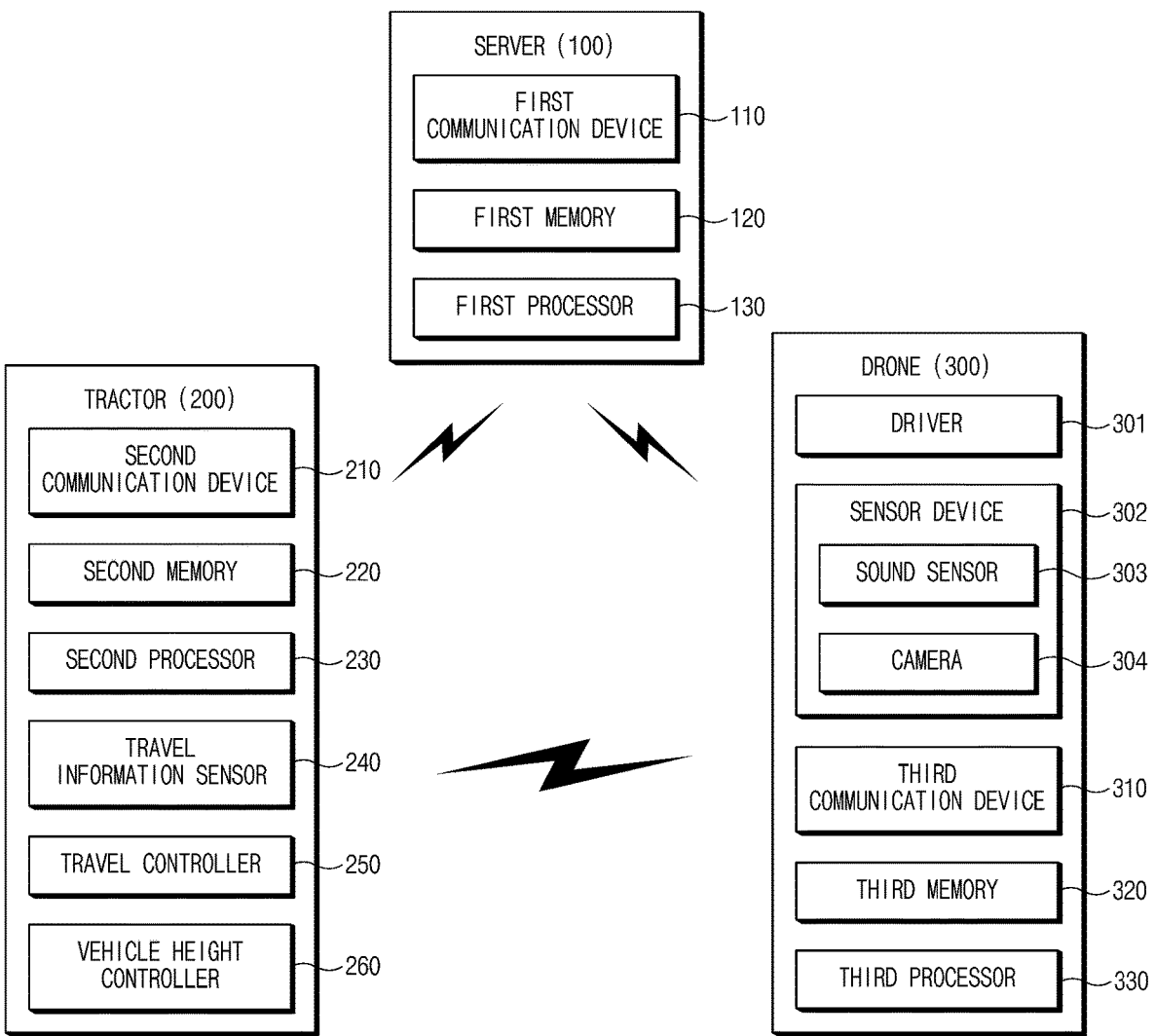
FIG. 2 is a block diagram showing a configuration of a system for controlling a vehicle.

Hereinafter, one or more example embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the one or more example embodiments of the present disclosure, a detailed description of the related known configuration or function will be omitted when it is determined that it interferes with the understanding of the example embodiments of the present disclosure.

In describing the components of the example embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, one or more example embodiments of the present disclosure will be described in detail with reference to FIGS. 1 to 10.

FIG. 1 is a schematic diagram of a system for controlling a vehicle. FIG. 2 is a block diagram showing a configuration of a system for controlling a vehicle.

Referring to FIGS. 1 and 2, a system for controlling a vehicle may include a server 100, a tractor 200, and air mobility 300. The air mobility 300 may be capable of unmanned flight or manned flight, and may be capable of autonomous flight. As an example, the air mobility 300 may be a drone, which is an unmanned aerial vehicle. Hereinafter, one or more example embodiments using the drone will be mainly described.

The server 100 may mediate the drone 300 and the vehicle for unattended connection between the vehicle and a trailer 400. The server 100 may be a hub that oversees a logistics transportation system or may be a component included in such a hub.

The server 100 may include a first communication device 110, a first memory 120, and a first processor 130.

The first communication device 110 may include a wireless communication module for communication with the tractor 200 and the drone 300.

The first memory 120 may store plurality of vehicle information and plurality of drone information.

When there is a request for a transport vehicle, the first processor 130 may select a target vehicle that matches the requested transport vehicle and the trailer 400, and select a target drone that mediates unmanned control for the coupling of the vehicle and the trailer 400. The target vehicle may be the tractor 200 that may be coupled (e.g., connected) to the trailer 400. Hereinafter, one or more embodiments in which the target vehicle is the tractor 200 will be mainly described. The target drone means one selected among a plurality of drones, and will be referred to as the drone 300 and described below.

The first processor 130 may select information of the tractor to be coupled to the trailer 400 and information of a drone for acquiring an image from the first memory 120.

The first processor 130 may transmit information of the tractor 200 and the trailer 400 to the drone 300 and may request confirmation of the information of the tractor 200 and the trailer 400. In addition, the first processor 130 may request the drone 300 that has confirmed the information of the tractor 200 and the trailer 400 to attempt to establish a short-range communication with the tractor 200. The drone 300 and the tractor 200 may perform the vehicle control while reducing a communication delay via the short-range communication.

The first processor 130 may request the tractor 200 to move to a location where the trailer 400 is located via the first communication device 110, and request the drone 300 to capture a top-view image and a side-view image of the tractor 200 and the trailer 400 via the first communication device 110. The top-view image and the side-view image may be captured at a location where both the tractor 200 and the trailer 400 may be contained in one image.

The first processor 130 may request the tractor 200 to move to the location of the trailer 400 and transmit the drone information. The drone information may include identification information of the drone 300 and information for establishing wireless communication with the drone 300.

When confirming that the tractor 200 is within a critical distance from the trailer 400, the first processor 130 may request the drone 300 to capture the top-view image. In addition, the first processor 130 may request calculation of a horizontal location deviation between the tractor 200 and the trailer 400 based on the top-view image. The horizontal location deviation may include a heading angle deviation between the tractor 200 and the trailer 400.

The first processor 130 may request the drone 300 to capture the side-view image when the horizontal location deviation is reduced and the tractor 200 is in a horizontally aligned state in which the tractor 200 may be coupled to the trailer 400.

In addition, the first processor 130 may request calculation of a vertical level deviation between a first fastening member (e.g., a fastener) of the tractor 200 and a second fastening member (e.g., a fastener) of the trailer 400 based on the side-view image.

The first fastening member may be a coupler 10 of the tractor 200, and the second fastening member may be a kingpin of the trailer 400.

The tractor 200 may approach the location of the trailer 400 in response to the request from the server 100, and may be coupled to the trailer 400 by performing autonomous driving based on the top-view image and the side-view image provided from the drone 300. Alternatively, the tractor 200 may be coupled to the trailer 400 by performing the autonomous driving under control of the drone 300.

To this end, the tractor 200 may include a second communication device 210, a second memory 220, a second processor 230, a travel information sensor 240, a travel controller 250, and a vehicle height controller 260.

The second communication device 210, which is for communication with the server 100 and the drone 300, may receive the top-view image and the side-view image from the drone 300.

The second memory 220 may store the identification information of the drone 300 and an algorithm for the autonomous driving.

The second processor 230 may control the travel controller 250 to perform the autonomous driving to a horizontal alignment location for the coupling with the trailer 400 based on the top-view image provided from the drone 300 in a close state.

The second processor 230 may control the vehicle height controller 260 (e.g., hydraulics system) such that vertical levels of the tractor 200 and the trailer 400 match each other based on the side-view image provided from the drone 300 in the horizontally aligned state.

The travel information sensor 240 may monitor a travel state of the vehicle, and the second processor 230 may determine whether the connection (e.g., coupling) with the trailer 400 proceeds smoothly based on information acquired by the travel information sensor 240. The travel information sensor may include a steering angle sensor, an accelerator position sensor (APS), a brake pedal sensor (BPS), a yaw rate sensor, a lateral acceleration sensor, a longitudinal acceleration sensor, and a wheel speed sensor.

The steering angle sensor, which is for detecting an angular velocity of a steering wheel, may detect a steering speed, a steering direction, and a steering angle of the steering wheel.

The APS may include a switch that is turned on when a motion of an accelerator pedal is detected and a resistance sensor whose resistance value changes in association with the motion of the accelerator pedal.

The BPS may include a switch that is turned on when a motion of a brake pedal is detected, and a resistance sensor whose resistance value changes in association with the motion of the brake pedal.

The yaw rate sensor, which is for detecting a degree of turning of the vehicle in a z-axis direction, may sense a yaw moment of the vehicle based on a change in vibration caused by a plate fork inside the yaw rate sensor.

The lateral acceleration sensor, which is for detecting a lateral acceleration of the vehicle, may be implemented integrally with a yaw rate sensor 14.

The longitudinal acceleration sensor, which is for detecting a longitudinal acceleration of the vehicle, may be mounted on a certain area of a wheel.

The wheel speed sensor may be attached to the wheel to detect a rotational speed and may obtain a vehicle speed based on the rotational speed of the wheel.

The travel controller 250 (also referred to as a movement controller, driving controller, etc.), which is for controlling driving and the speed of the vehicle under control of the second processor 230, may include an engine controller, a braking controller, a transmission control module, and a steering controller.

The engine controller, as an actuator that controls an engine of the vehicle, may control acceleration of the vehicle. The engine controller may be implemented as an engine management system (EMS). The engine controller may control a driving torque of the engine based on accelerator pedal position information output from the accelerator position sensor.

The braking controller, as an actuator that controls deceleration of the vehicle, may be implemented as an electronic stability control (ESC). The braking controller may control a brake pressure to follow a target speed requested by the second processor.

The transmission control module, as an actuator for controlling a transmission of the vehicle, may be implemented as an electric shift by wire (SBW). The transmission control module may control a speed change of the vehicle based on a gear location and a gear state range.

The steering controller, which is for controlling steering of the vehicle, may control the steering angle of the steering wheel.

The vehicle height controller 260, which is for adjusting a height of the tractor 200, may be specifically for adjusting a location of the coupler 10 of the tractor 200.

The drone 300 may assist the autonomous driving of the tractor 200 for being coupled to the trailer 400 or may control the autonomous driving of the tractor 200 to couple the tractor 200 to the trailer 400.

To this end, the drone 300 may include a driver 301, a sensor device 302, a third communication device 310, a third memory 320, and a third processor 330.

The driver 301 may include at least one propeller installed vertically on a main body and a motor for driving the propeller. Alternatively, the driver 301 may be formed of an air spray-type propeller structure.

The sensor device 302 may include a sensor for checking a flight state of the drone 300. For example, the sensor device 302 may include a sensor for checking a turning motion state of the drone 300 and a sensor for checking a translational motion state. The turning motion state of the drone 300 may include 'yaw', 'pitch', and 'roll', and the translational motion state may include longitude, latitude, altitude, and speed.

In addition, the sensor device 302 may include a camera 304 and a sound sensor 303.

The camera 304 may include a first camera for acquiring the top-view image and a second camera for acquiring the side-view image, and one camera may be used as the first camera and the second camera.

The sound sensor 303, which is for collecting external sound, may use a microphone.

The third communication device 310 is for communication with the server 100 and the tractor 200. The drone 300 may transmit the image acquired by the camera 304 via the third communication device 310.

The third memory 320 may store identification information of the tractor 200, and the drone 300 may distinguish the tractor 200 using the identification information of the tractor 200.

The third processor 330 may fly to a place where the tractor 200 and the trailer 400 are located in response to a call from the server 100, and may acquire the top-view image and the side-view image of the tractor 200 and the trailer 400 in response to the request of the server 100.

In addition, the third processor 330 may control the travel controller 250 of the tractor 200 to perform the autonomously driving to the horizontal alignment location where the tractor 200 may be coupled to the trailer 400 based on the top-view image.

The third processor 330 may control the vehicle height controller 260 of the tractor 200 such that the vertical levels of the tractor 200 and the trailer 400 match each other based on the side-view image in the state in which the tractor 200 is horizontally aligned.

The first communication device 110, the second communication device 210, and the third communication device 310 shown in FIG. 2 may transmit and receive a wireless signal with at least one of a base station, an external terminal, and a center on a mobile communication network built based on technical standards or communication schemes for mobile communication. For example, the communication device may perform the communication based on a global system for mobile communication (GSM), a code division multi access (CDMA), a code division multi access 2000 (CDMA2000), an enhanced voice-data optimized or enhanced voice-data only (EV-DO), a wideband CDMA (WCDMA), a high speed downlink packet access (HSDPA), a high speed uplink packet access (HSUPA), a long term evolution (LTE), and a long term evolution-advanced (LTE-A). The wireless signal may include a voice call signal, a video call signal, or various types of data based on text/multimedia message transmission/reception.

The first memory 120, the second memory 220, and the third memory 320 shown in FIG. 2 may use a hard disk drive, a flash memory, an electrically erasable programmable read-only memory (EEPROM), a static RAM (SRAM), a ferro-electric memory (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

The second processor 230 or the third processor 330 may detect the tractor 200 and the trailer 400 from the image acquired by the drone 300 and perform artificial intelligence learning to determine the location of the tractor 200 and the trailer 400. To this end, the second processor 230 or the third processor 330 may include an artificial intelligence (AI) processor. The AI processor may learn a neural network using a pre-stored program. The neural network for detecting the target vehicle and a dangerous vehicle may be designed to simulate a human brain structure on a computer, and may include a plurality of network nodes having weights that simulate neurons of a human neural network. The plurality of network nodes may transmit and receive data based on a connection relationship so as to simulate synaptic activities of neurons that transmit and receive signals via synapses. The neural network may include a deep learning model developed from a neural network model. In the deep learning model, the plurality of network nodes may exchange data with each other based on a convolution connection relationship while being located in different layers. Examples of the neural network models may include various deep learning techniques such as a deep neural network (DNN), a convolutional deep neural network (CNN), a recurrent Boltzmann machine (RNNs), a restricted Boltzmann machine (RBM), a deep belief network (DBN), and a deep Q-network.

Figure 3:
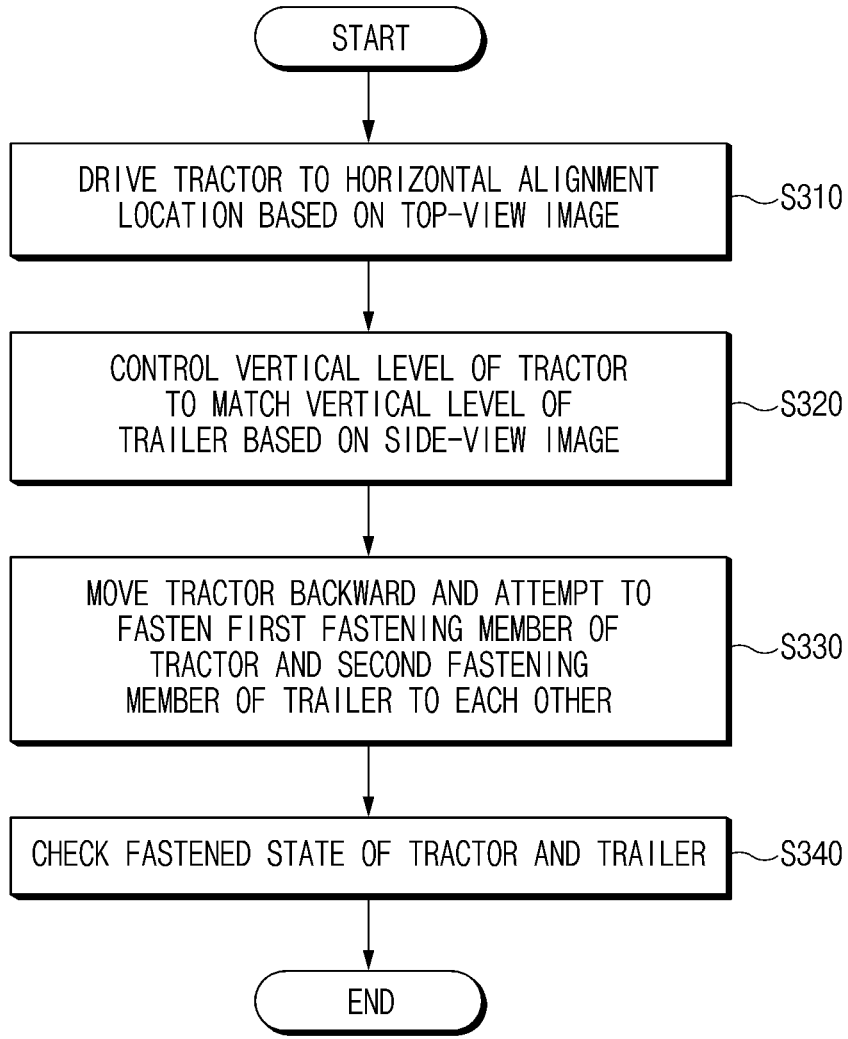
FIG. 3 is a flowchart for illustrating a method for controlling a vehicle.

FIG. 3 is a flowchart for illustrating a method for controlling a vehicle. Each of procedures shown in FIG. 3 may be performed by the second processor 230 of the tractor 200 or the third processor 330 of the drone 300. Accordingly, in a description shown in FIG. 3, a processor may refer to the second processor 230 or the third processor 330.

Hereinafter, referring to FIG. 3, the method for controlling the vehicle is as follows.

In S310, the processor may drive the tractor to the horizontal alignment location based on the top-view image. Operation S310 will be described in conjunction with FIGS. 4 and 5 as follows.

FIG. 4 is a diagram showing an example of a top-view image acquired by a drone.

Referring to FIG. 4, the processor may detect the tractor 200 and the trailer 400 from the top-view image and calculate the horizontal location deviation.

The horizontal location deviation may include a heading angle deviation Da between the tractor 200 and the trailer. In addition, the horizontal location deviation may include a spacing (e.g., distance or lateral distance) Dy between a first axis, which passes through a first reference point P1 of the tractor 200, and a second reference point P2 of the trailer 400. In addition, the horizontal location deviation (e.g., longitudinal distance) may be a distance (e.g., a longitudinal distance) Dx between the first reference point P1 and the second reference point P2 on a first axis Lx. The first reference point P1 may be a center (e.g., a midpoint) of a width of a rear surface (e.g., a rear edge) of the tractor 200, and the first axis may be a straight line (e.g., a longitudinal and/or medial axis) that passes through the first reference point and a center (e.g., a midpoint) of a width of a front surface (e.g., a front edge) of the tractor 200 and may be referred to as an x-axis. The second reference point P2 may be a center (e.g., a midpoint) of a width of a front surface (e.g., a front edge) of the trailer 400.

FIG. 5 is a view showing a location of a tractor and a trailer whose horizontal alignment has been completed.

Referring to FIG. 5, arranging the tractor 200 at the horizontal alignment location may include controlling the horizontal location deviation to be at a certain level.

The arranging of the tractor 200 at the horizontal alignment location may include controlling the tractor 200 such that the heading angle deviation Da is equal to or smaller than a preset critical angle. It is ideal that the heading angle deviation Da is controlled to be 0°, and accordingly, the critical angle may be set to a magnitude close to 0°.

The arranging of the tractor 200 at the horizontal alignment location may include controlling the tractor 200 such that the spacing Dy between the first axis Lx and the second reference point P2 of the trailer 400 is equal to or smaller than a preset first critical value. It is ideal that Dy is controlled to be 0, and accordingly, the first critical value may be set to a length close to 0.

The arranging of the tractor 200 at the horizontal alignment location may include controlling the tractor 200 such that the distance Dx between the first reference point P1 and the second reference point P2 on the first axis Lx is equal to or smaller than a preset second critical value. Dx may be set to have margin enough to avoid a collision with the trailer 400 while the tractor 200 is traveling for the horizontal alignment within a range in which a backward movement range is not excessively great in operation S330. For example, Dx may be set to about 2 m.

In S320, after the tractor 200 is horizontally aligned, the processor may control the vertical level of the tractor to match the vertical level of the trailer based on the side-view image. This is as follows with reference to FIG. 6.

FIG. 6 is a diagram for illustrating a method for adjusting a vertical level of a tractor. In FIG. 6, the z-axis may be an axis perpendicular to a xy plane.

Adjusting the vertical level of the tractor 200 may include adjusting the height of the tractor 200 such that a vertical level of the first fastening member (e.g., a fastener) of the tractor 200 and a vertical level of the second fastening member (e.g., a fastener) of the trailer 400 match each other. The first fastening member may be the coupler 10, and the second fastening member may be a kingpin 20. To this end, the processor may detect the coupler and the kingpin from the side-view image.

The matching of the vertical levels of the coupler 10 and the kingpin 20 may be controlling the vehicle height controller 260 of the tractor 200 such that a deviation Dz (e.g., height difference) between the vertical level of the coupler 10 from a road surface and the vertical level of the kingpin 20 from the road surface is equal to or smaller than a preset third critical value. It is ideal that Dz is 0, and accordingly, the third critical value may be set to a magnitude close to 0.

In S330, the processor may move the tractor 200 backward and couple the coupler 10 of the tractor 200 and the kingpin 20 of the trailer 400 to each other. Because the horizontal alignment and the vertical alignment of the tractor 200 to be fastened with the trailer 400 have been completed via operations S310 and S320, the tractor 200 may move backward and be fastened with the trailer 400 in a state in which the steering controller has not been controlled.

After operation S330, the processor may determine whether the tractor 200 and the trailer 400 are smoothly fastened to each other based on the sound sensor or the side-view image acquired by the drone 300.

For example, the processor may monitor the side-view image acquired while the tractor 200 moves backward, and determined that the tractor 200 and the trailer 400 are coupled to each other when a spacing between the coupler 10 and the kingpin 20 on a first axis Lx is equal to or smaller than a fourth critical value. The spacing between the coupler 10 and the kingpin 20 may be a spacing between preset arbitrary fastening points that come into contact with each other when the coupler 10 and the kingpin 20 are coupled to each other.

Hereinafter, a method for controlling a vehicle is as follows. FIGS. 7 to 10 are diagrams for illustrating a method for controlling a vehicle. FIGS. 7 to 10 are diagrams for illustrating each of procedures of coupling the tractor to the trailer using the drone and the tractor under the control of the server. Hereinafter, it may be understood that each of the procedures shown in FIGS. 7 to 10 is performed by a processor of a corresponding component. For example, procedures performed by the server 100 may be performed under the control of the first processor 130. Procedures performed by the tractor 200 may be performed under the control of the second processor 230, and procedures performed by the drone 300 may be performed under the control of the third processor 330.

Figure 7:
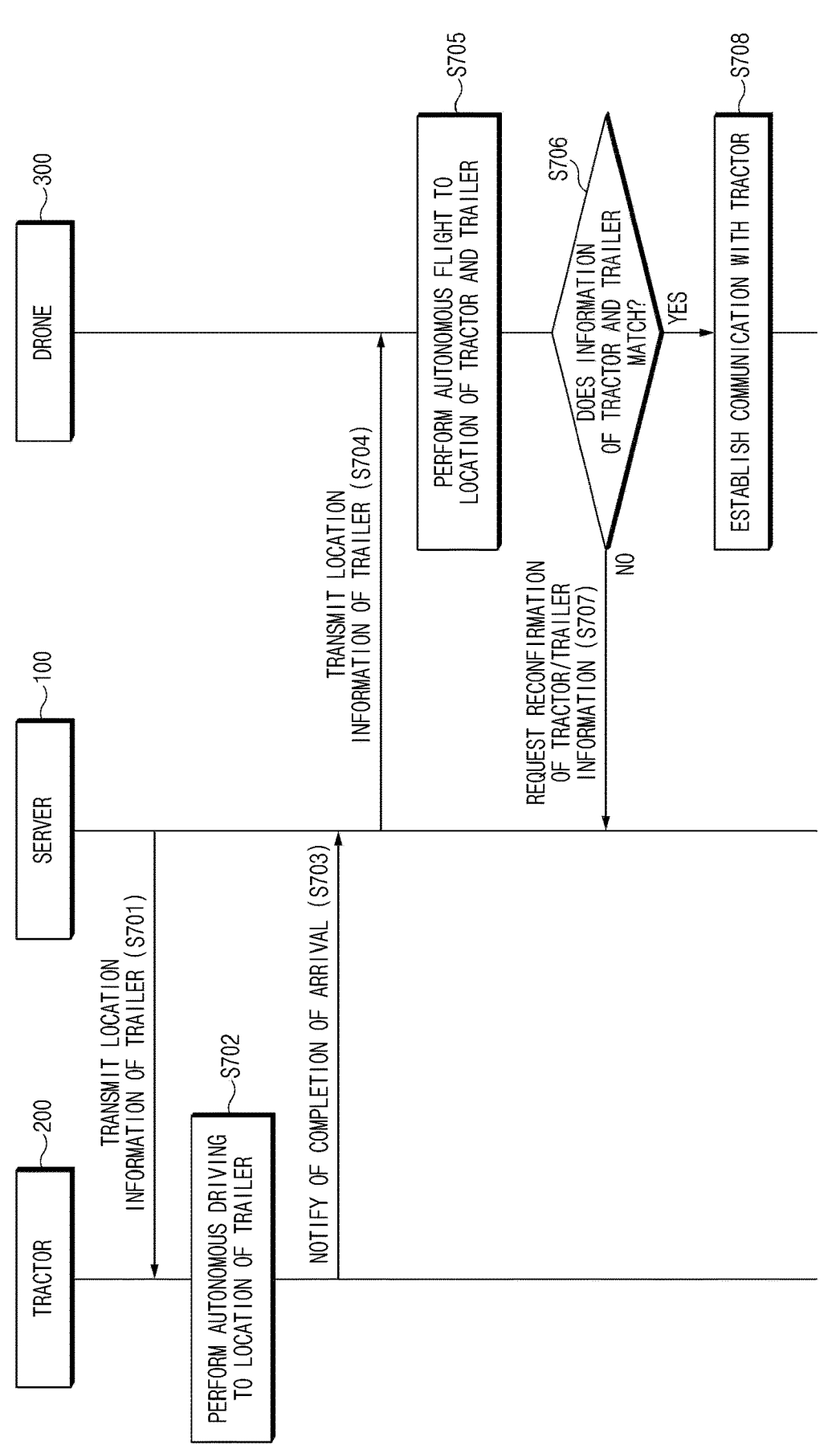
FIG. 7 is a diagram for illustrating a procedure for initiating an attempt to fasten a tractor and a trailer to each other.

FIG. 7 is a diagram for illustrating a procedure for initiating an attempt to fasten a tractor and a trailer to each other. FIG. 7 illustrates the procedure of initiating the attempt to fasten the tractor and the trailer to each other under supervision of the server.

Referring to FIG. 7, the procedure of attempting to fasten the tractor and the trailer to each other is as follows.

In S701, the server 100 may transmit location information of the trailer 400 to the tractor 200. After searching for the tractor 200 to be coupled with the trailer 400, the server 100 may transmit the location information of the trailer 400 to the corresponding tractor 200. In addition, the server 100 may transmit a message requesting to move to the location of the trailer 400 to the tractor 200 together with the location information of the trailer 400.

In S702, the tractor 200 may perform the autonomous driving to the location of the trailer 400 provided from the server 100.

In S703, the tractor 200 may notify the server 100 that the tractor has arrived at the location of the trailer 400.

In S704, after receiving the notification indicating that the tractor 200 has arrived at the location of the trailer 400, the server 100 may transmit identification information and the location information of the trailer 400 to the drone 300.

In S705, the drone 300 may perform autonomous flight to the location where the trailer 400 is located based on the location information of the trailer 400 provided from the server 100.

In S706, the drone 300 that has moved to the location of the tractor 200 and the trailer 400 may check the identification information of the tractor 200 and the trailer 400. To this end, the drone 300 may check license plates of the tractor 200 and the trailer 400 using the camera 304 or check the identification information of the tractor 200 and the trailer 400 using a short-range communication member (e.g., via a short-range communication channel).

In S707, when the information (e.g., identification information) of the tractor 200 and the information (e.g., identification information) of the trailer 400 do not match each other, the drone 300 may request the server 100 to reconfirm the information of the tractor 200 and the trailer 400.

In S708, when the information (e.g., identification information) of the tractor 200 and the information (e.g., identification information) of the trailer 400 match each other, the drone 300 may establish communication with the tractor 200.

Figure 8:
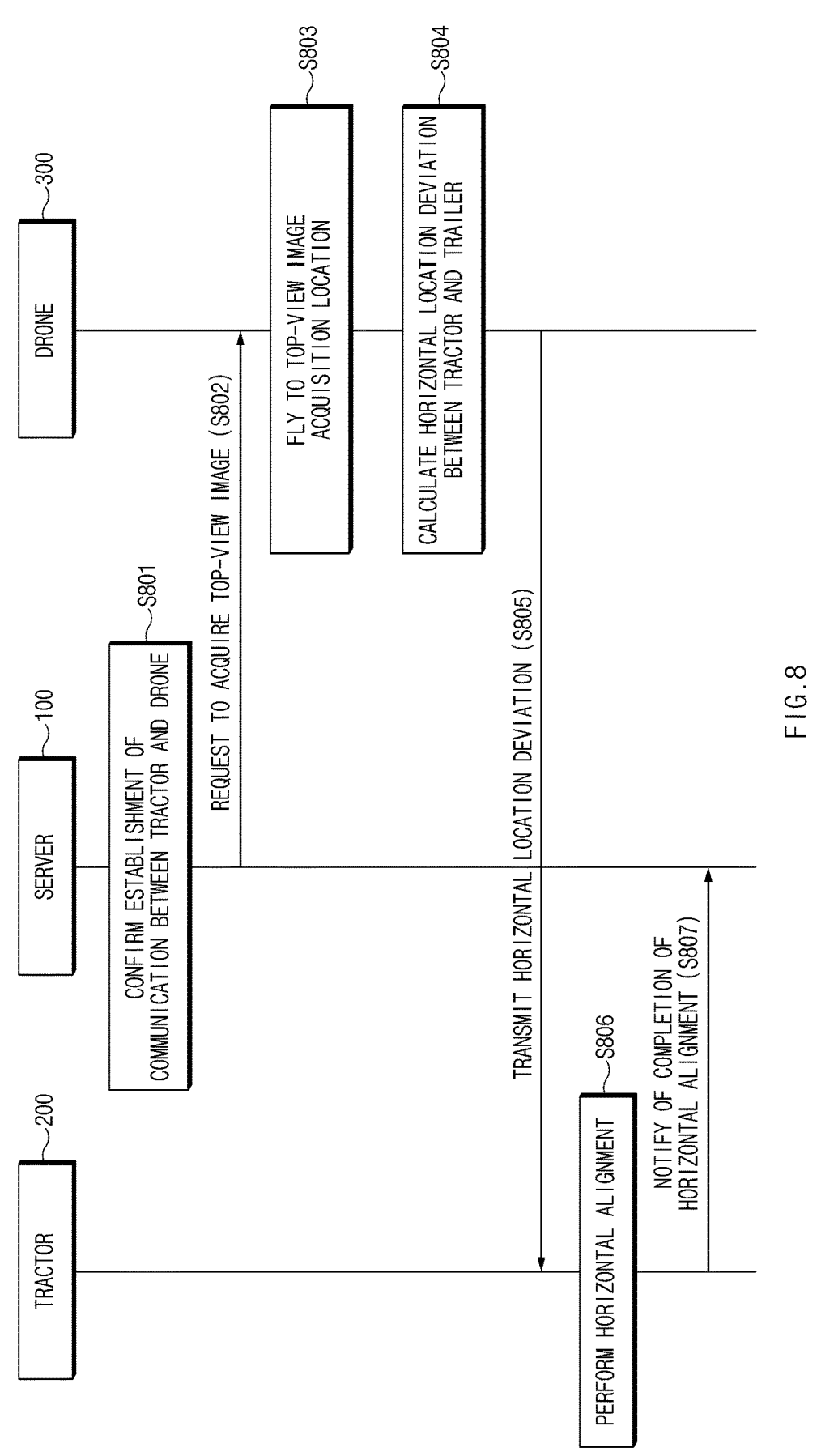
FIG. 8 is a diagram for illustrating a procedure for horizontally aligning a tractor and a trailer with each other.

FIG. 8 is a diagram for illustrating a procedure for horizontally aligning a tractor and a trailer with each other. Referring to FIG. 8, an example procedure for horizontally aligning the tractor is as follows.

In S801, when receiving a notification indicating that the communication is established from the drone 300, the server 100 may confirm that the communication between the tractor 200 and the drone 300 has been established.

In S802, when it is confirmed that the communication between the tractor 200 and the drone 300 has been established, the server 100 may request the drone 300 to acquire the top-view image.

In S803, the drone 300 may fly to a location above the tractor 200 and the trailer 400 to acquire the top-view image.

In S804, the drone 300 may calculate the horizontal location deviation between the tractor 200 and the trailer 400. As shown in FIG. 4, the horizontal location deviation may include the heading angle deviation Da between the tractor 200 and the trailer, the spacing (e.g., distance or lateral distance) Dy between the first (e.g., longitudinal and/or medial) axis Lx and the second reference point P2 (e.g., a midpoint of a front edge of the trailer 400), and the distance (e.g., longitudinal distance) Dx between the first reference point P1 (e.g., a midpoint of a rear edge of the tractor 200) and the second reference point P2.

In S805, the drone 300 may transmit the horizontal location deviation between the tractor 200 and the trailer 400 to the tractor 200.

In S806, the tractor 200 may perform the horizontal alignment based on the horizontal location deviation provided from the drone 300. To this end, the tractor 200 may control the travel controller 250 such that the horizontal location deviations satisfy preset conditions.

The arranging of the tractor 200 at the horizontal alignment location may be moving the tractor 200 such that the heading angle deviation Da is equal to or smaller than the preset critical angle. In addition, the arranging of the tractor 200 at the horizontal alignment location may be moving the tractor 200 such that the spacing Dy between the first axis Lx and the second reference point P2 of the trailer 400 is equal to or smaller than the preset first critical value, and the distance Dx between the first reference point P1 and the second reference point P2 on the first axis Lx is equal to or smaller than the preset second critical value.

In S807, the tractor 200 may notify the server 100 that the horizontal alignment has been completed after moving to the horizontal alignment location.

Figure 9:
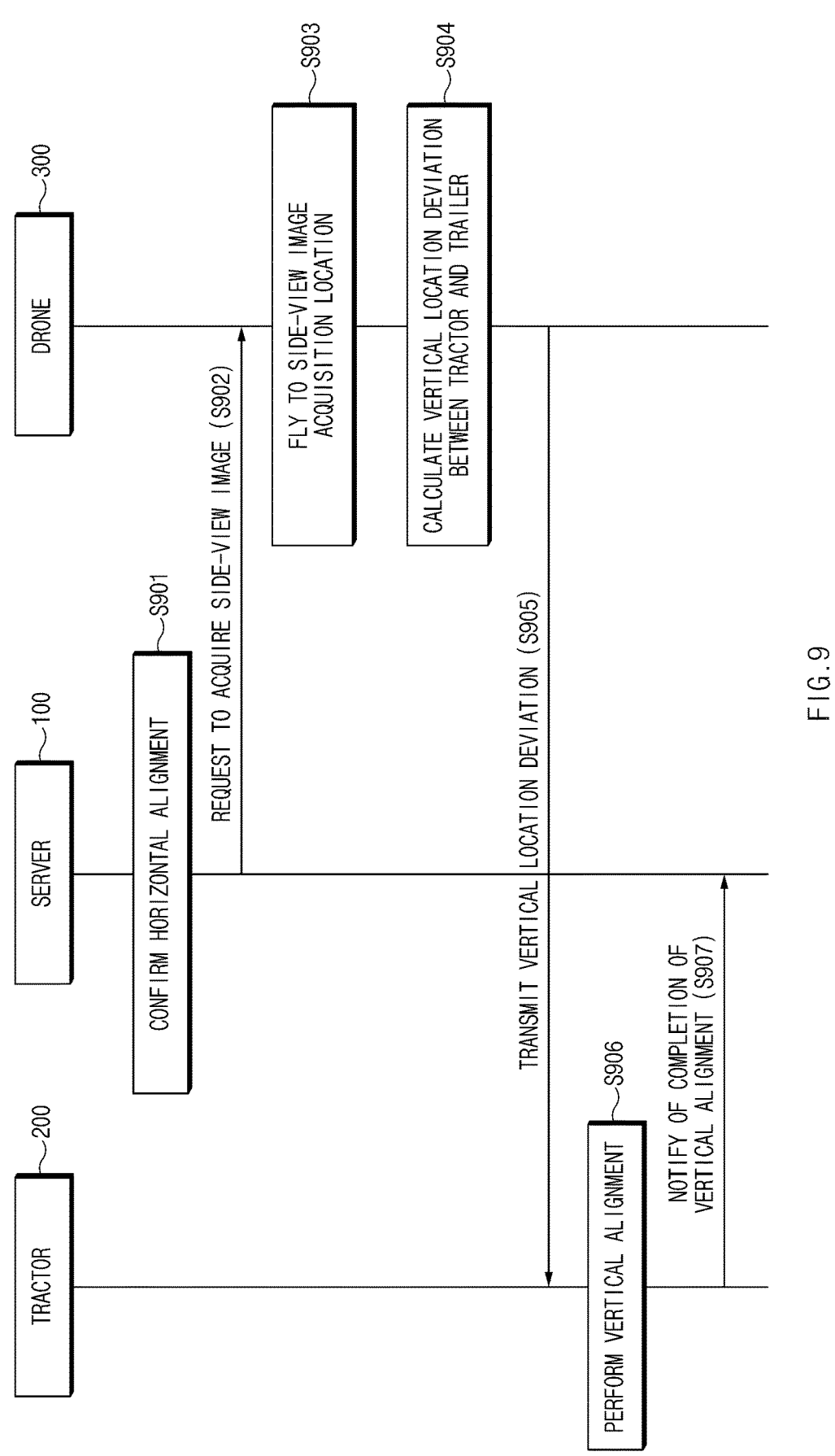
FIG. 9 is a diagram for illustrating a procedure for vertically aligning a tractor and a trailer with each other.

FIG. 9 is a diagram for illustrating a procedure for vertically aligning a tractor and a trailer with each other. Referring to FIG. 9, an example procedure for vertically aligning the tractor is as follows.

In S901, when receiving the notification indicating that the horizontal alignment has been completed from the tractor 200, the server 100 may confirm that the horizontal alignment of the tractor 200 has been completed.

In S902, when the horizontal alignment of the tractor 200 has been completed, the server 100 may request the drone 300 to acquire the side-view image.

In S903, the drone 300 may acquire the side-view images of the tractor 200 and the trailer 400.

In S904, the drone 300 may calculate a vertical location deviation between the tractor 200 and the trailer 400 based on the side-view image. The vertical location deviation between the tractor 200 and the trailer 400 may be the vertical level deviation between the coupler 10 and the kingpin 20. In particular, the vertical location deviation may be acquired by presetting the fastening points located at the same vertical level when the coupler 10 and the kingpin 20 are coupled to each other, and calculating a vertical level deviation between the fastening points.

In S905, the drone 300 may transmit the vertical location deviation between the tractor 200 and the trailer 400 to the tractor 200.

In S906, the tractor 200 may perform the vertical alignment by adjusting the height thereof based on the vertical location deviation. The procedure of adjusting the height of the vehicle may be adjusting the height of the vehicle such that the vertical level deviation between the coupler 10 and the kingpin 20 is equal to or smaller than the third critical value.

In S907, after the vertical location is aligned, the tractor 200 may notify the server 100 of the vertical location alignment.

Figure 10:
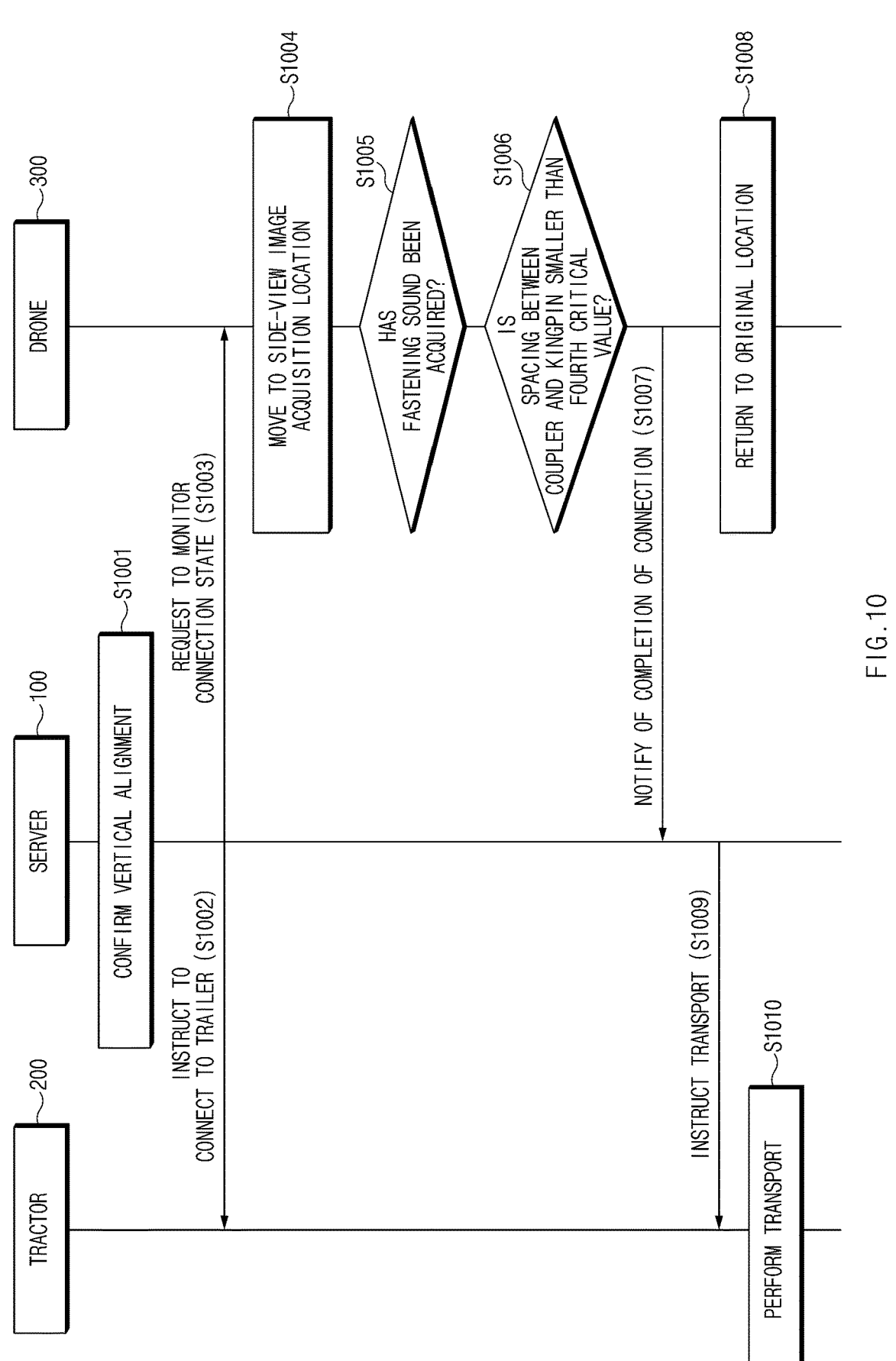
FIG. 10 is a diagram for illustrating a procedure of controlling coupling of a tractor and a trailer.

FIG. 10 is a diagram for illustrating a procedure of controlling coupling of a tractor and a trailer. Referring to FIG. 10, an example procedure of controlling the coupling of the tractor and the trailer is as follows.

In S1001, the server 100 may determine whether the tractor 200 is vertically aligned based on a message transmitted from the tractor 200.

In S1002, after the vertical alignment is completed, the server 100 may instruct the tractor 200 to connect (e.g., couple) to the trailer. The tractor 200 may attempt to connect to the trailer 400 by moving backward in response to the instruction of the server 100.

In S1003, after the vertical alignment is completed, the server 100 may request the drone 300 to monitor a connection state.

In S1004, the drone 300 may move to the side-view image acquisition location in response to the request of the server 100.

In S1005, the drone 300 may monitor whether a fastening sound is sensed via the sound sensor 303.

In S1006, the drone 300 may monitor whether the spacing between the coupler and the kingpin is smaller than the fourth critical value via the side-view image.

In S1007, when the fastening sound is sensed and the spacing between the coupler and the kingpin is smaller than the fourth critical value, the drone 300 may notify the server 100 that the connection (e.g., coupling) between the tractor 200 and the trailer 400 has been complete.

In S1008, when the connection between the tractor 200 and the trailer 400 has been completed, the drone 300 may return to an original location thereof.

In S1009, the server 100 may transmit a transport instruction to the tractor 200 based on the fact that the connection between the tractor 200 and the trailer 400 has been completed. For example, the transport instruction may be an indication that the tractor 200 is ready to start transporting the trailer to its destination. To this end, the server 100 may transmit transport destination information from the tractor 200.

In S1010, the tractor 200 may perform a transportation work in response to the instruction of the server 100.

The description above is merely illustrative of the technical idea of the present disclosure, and various modifications and changes may be made by those skilled in the art without departing from the essential characteristics of the present disclosure.

Therefore, the one or more example embodiments disclosed in the present disclosure are not intended to limit the technical idea of the present disclosure but to illustrate the present disclosure, and the scope of the technical idea of the present disclosure is not limited by the example embodiments. The scope of the present disclosure should be construed as being covered by the scope of the appended claims, and all technical ideas falling within the scope of the claims should be construed as being included in the scope of the present disclosure.

The labor force may be reduced because the tractor and the trailer are coupled (e.g., connected) to each other by controlling the tractor to perform the autonomous driving based on the location of the tractor and the trailer acquired from the image of the tractor and the trailer.

In addition, the identification information of the multiple tractors and trailers are retained, the tractor and the trailer are searched for using the identification information, and the tractor and the trailer are controlled to perform the autonomous driving, so that a hassle of the driver directly finding the tractor and the trailer may be reduced.

In addition, various effects identified directly or indirectly through the present document may be provided.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A computing device for controlling vehicles, the computing device comprising:

a communication device;

a memory storing vehicle information and air mobility device information; and a processor configured to:

select, based on the vehicle information, a target vehicle to be coupled to a trailer;

select, based on the air mobility device information, a target air mobility device; and transmit, via the communication device, at least one signal comprising:

an indication for requesting the target vehicle to move to a location for coupling the target vehicle to the trailer; and an indication for requesting the target air mobility device to capture at least one image containing the target vehicle and the trailer, wherein the location is determined based on a lateral distance being less than or equal to a first threshold value, wherein the lateral distance includes a distance between a first line and a second line, and wherein the first line passes through a center of the target vehicle in a direction of travel of the target vehicle, and the second line passes through a center of a front side of the trailer and is parallel to the first line.

2. The computing device of claim 1, wherein the at least one signal further comprises an indication for requesting the target air mobility device to attempt to establish, based on identification information of the target vehicle and the trailer, a short-range communication with the target vehicle.

3. The computing device of claim 1, wherein the at least one signal further comprises an indication for requesting the target air mobility device to capture, based on a distance between the target vehicle and the trailer being less than a threshold distance, a top-view image of the target vehicle.

4. The computing device of claim 1, wherein the at least one signal further comprises an indication for requesting, based on completion of horizontal alignment between the target vehicle and the trailer for coupling, the target air mobility device to capture a side-view image of the target vehicle.

5. The computing device of claim 1, wherein the at least one signal further comprises an indication for requesting the target air mobility device to continuously capture side-view images of the target vehicle while the target vehicle is moving backward to be coupled to the trailer.

6. The computing device of claim 1, wherein the at least one signal further comprises an indication for requesting the target air mobility device to acquire external sound information while the target vehicle is moving backward to be coupled to the trailer.

7. The computing device of claim 1, wherein the processor is configured to transmit, based on confirmation of coupling of the target vehicle with the trailer, a transport instruction to the target vehicle.

8. A device configured to control a vehicle, the device comprising:

a communication device configured to receive at least one image containing the vehicle and a trailer;

15

16 a movement controller configured to control movement of the vehicle;

a vehicle height controller configured to adjust a height of the vehicle; and a processor configured to:

cause, based on the image, the movement controller to horizontally align the vehicle with the trailer for coupling the vehicle to the trailer such that a lateral distance between a first line and a second line is less than or equal to a first threshold value; and cause the vehicle height controller to adjust the height of the vehicle to vertically align the vehicle with the trailer for coupling the vehicle to the trailer, wherein the first line passes through a center of the vehicle in a direction of travel of the vehicle, and the second line passes through a center of a front side of the trailer and is parallel to the first line.

9. The device of claim 8, wherein the communication device is configured to receive, via a short-range communication channel, the image from an air mobility device.

10. The device of claim 8, wherein the image comprises a top-view image of the vehicle, and wherein the processor is further configured to cause the movement controller to adjust, based on the top-view image, a heading angle deviation between the vehicle and the trailer to be less than or equal to a threshold angle.

11. The device of claim 8, wherein the processor is further configured to cause the movement controller to adjust a longitudinal distance between a first reference point and a second reference point to be less than or equal to a second threshold value, wherein the first reference point comprises a midpoint of a rear edge of the vehicle, and wherein the second reference point comprises a midpoint of a front edge of the trailer.

12. The device of claim 8, wherein the image comprises a side-view image of the vehicle, and wherein the processor is further configured to:

detect, based on the side-view image, a coupler and a kingpin; and cause the vehicle height controller to adjust a height difference between the coupler and the kingpin to be less than or equal to a threshold value.

13. The device of claim 12, wherein the processor is further configured to:

monitor the side-view image received via the communication device while the vehicle is moving backward; and determine, based on the side-view image and based on a determination that a distance between the coupler and the kingpin is less than or equal to a second threshold value, that the vehicle and the trailer are coupled to each other.

14. The device of claim 12, wherein the processor is further configured to:

receive, via the communication device and while the vehicle is moving backward, sound information from a microphone located within a predetermined distance from one of the vehicle or the trailer; and determine, based on the sound information, completion of the coupling of the vehicle and the trailer.

15. A method for controlling a vehicle, the method comprising:

causing, based on a first image containing the vehicle and a trailer, the vehicle to move to a horizontally aligned position for coupling with the trailer;

detecting, based on a second image, a first fastener of the vehicle and a second fastener of the trailer;

adjusting a height of the vehicle to align a vertical level of the first fastener with a vertical level of the second fastener; and causing, based on a determination that the vehicle is horizontally and vertically aligned to the trailer, the vehicle to move backward to couple the first fastener of the vehicle to the second fastener of the trailer, wherein the horizontally aligned position is determined based on a lateral distance being less than or equal to a first threshold value, wherein the lateral distance includes a distance between a first line and a second line, and wherein the first line passes through a center of the vehicle in a direction of travel of the vehicle, and the second line passes through a center of a front side of the trailer and is parallel to the first line.

16. The method of claim 15, wherein the first image is a top-view image, and wherein the method further comprises:

acquiring, using an air mobility device, the top-view image from above the vehicle and the trailer;

determining a heading angle deviation between the vehicle and the trailer; and detecting a first midpoint of a rear edge of the vehicle and detecting a second midpoint of a front edge of the trailer.

17. The method of claim 15, wherein the causing of the vehicle to move to the horizontally aligned position comprises:

causing the vehicle to adjust a heading angle deviation between the vehicle and the trailer to be less than or equal to a threshold angle.

18. The method of claim 15, wherein the causing of the vehicle to move to the horizontally aligned position comprises:

causing the vehicle to adjust a longitudinal distance between a first reference point and a second reference point to be less than or equal to a second threshold value, wherein the first reference point comprises a midpoint of a rear edge of the vehicle, and wherein the second reference point comprises a midpoint of a front edge of the trailer.

19. The method of claim 15, wherein the second image comprises a side-view image of the vehicle, wherein the first fastener comprises a coupler, wherein the second fastener comprises a kingpin, and wherein the adjusting of the height of the vehicle comprises:

adjusting the height of the vehicle to align a vertical level difference between the coupler and the kingpin to be less than or equal to a threshold value.

20. The method of claim 15, wherein the second image comprises a side-view image of the vehicle, wherein the first fastener comprises a coupler, wherein the second fastener comprises a kingpin, and wherein the method further comprises coupling the first fastener of the vehicle to the second fastener of the trailer by:

monitoring the side-view image while the vehicle is moving backward; and determining, based on the monitoring of the side-view image, whether a distance between the coupler and the kingpin is less than or equal to a threshold value.

* * * * *